June 30, 1936.  F. P. DAVIS  2,046,252
MUFFLER FOR AIRCRAFT
Filed April 5, 1933  2 Sheets-Sheet 1
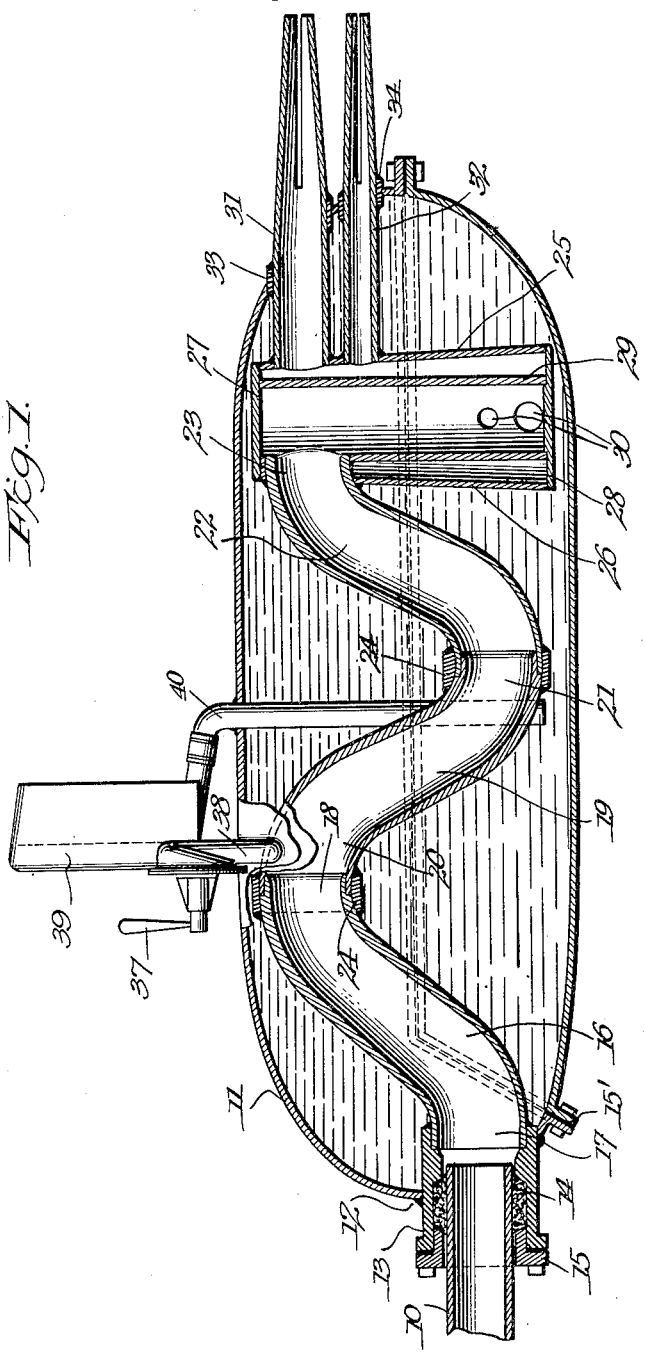
Inventor
Frank P. Davis June 30, 1936.          F. P. DAVIS                2,046,252
              MUFFLER FOR AIRCRAFT
           Filed April 5, 1933        2 Sheets-Sheet 2
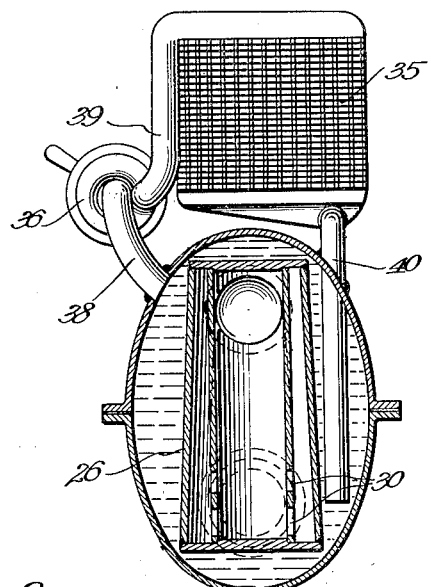
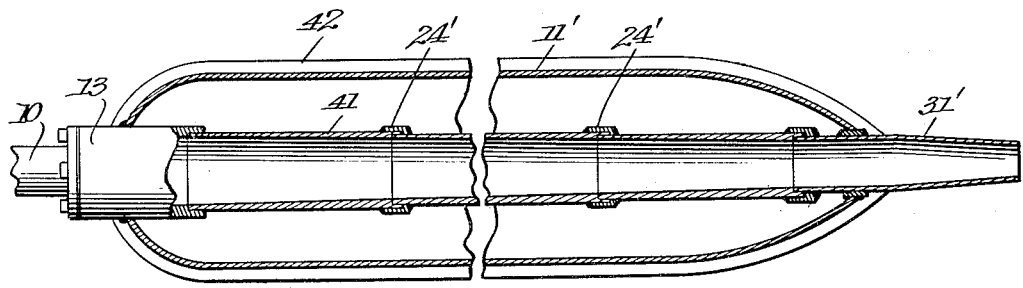
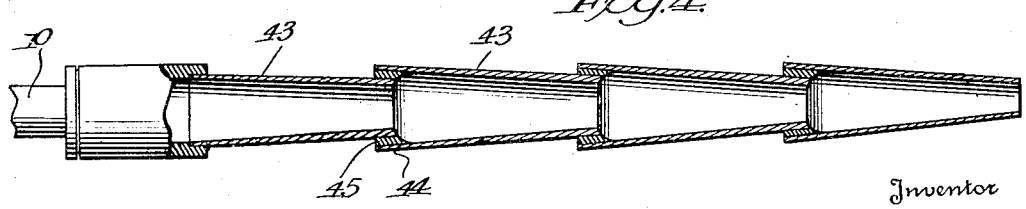

Patented June 30, 1936

2,046,252

UNITED STATES PATENT OFFICE 2,046,252

MUFFLER FOR AIRCRAFT

Frank P. Davis, Hileah, Fla., assignor of one-half to Joseph H. Walsh, Jacksonville, Fla.

Application April 5, 1933, Serial No. 664,616

16 Claims. (Cl. 181—35)

This invention relates to mufflers for internal combustion engines, and more particularly to mufflers adapted for use with aircraft.

It is an object of the present invention to provide a silencing device which may be associated with the exhaust manifold, collector ring, or other exhaust conduit, and which will effectively dissipate sound waves resulting from the driving explosions in the motor, and eliminate exhaust noises, without impairing the efficiency of the motor.

It is a further object of the invention to provide an efficient exhaust silencer which, when in use, will create or build up no substantial back pressure on the motor.

It is a further object of the invention to provide a device which will substantially eliminate the fire hazard in aircraft which results from the presence of hot gases or flame issuing from the conventional stacks, exhaust manifolds, or other conduits.

It is a further object of the invention to provide a muffler for use with aircraft engines, which is of small size, light weight, and is of compact nature. Preferably, the parts of the apparatus which are exposed to the air, or which are positioned within the blast of the aircraft propeller, are streamlined so as to reduce to a minimum undue wind resistance.

It is well understood by those skilled in the art that exhaust noises of internal combustion engines result primarily from the intermittent discharge of large volumes of highly heated exhaust gases under tremendous pressure to the atmosphere. These discharges disturb the surrounding air and creat violent sound waves, which are objectionable for many obvious reasons. Conventional mufflers operate upon the general principle of an expansion tank. That is, the pulsations of compressed gas are conveyed from the motor to a tank, instead of directly to the atmosphere, and the gas is permitted to expand in the tank, traverse a labyrinthine path, and issue in a more nearly constantly flowing stream. The large volume of hot gas discharged into a conventional muffler is not reduced therein, however, and an equal volume must issue therefrom, in a more or less pulsating flow, under high pressure, and, although the most violent sound waves are substantially eliminated, some noise remains, due to the discharge of gas at high pressure to the atmosphere. Constructions of the conventional muffler type are objectionable, for the additional reason that they invariably build up a back pressure upon the exhaust side of the engine, since the flow of gas from the muffler, or expansion tank, is necessarily somewhat restricted.

This back pressure adversely affects the efficiency of the engine, and at high speeds, when the flow of gases increases to a large volume, the back pressure increases proportionately, with a consequent increased loss of efficiency. Because of this fact, aeroplanes are invariably operated without any exhaust mufflers, in spite of the objectionable noise referred to above.

It is a well known phenomenon that the volume and pressure of a gas bear a definite relation to the temperature thereof. I have discovered that both the volume and the pressure of the exhaust gases of an internal combustion engine may be greatly decreased by cooling the said gases prior to their discharge to atmosphere. By this means, the volume of gas is reduced to such a degree that substantial back pressure is eliminated. Further, the pressure of the exhaust gas is decreased to a point where discharge of the pulsations to atmosphere results in no substantial noise.

In order to accomplish the objects of the invention, and in order to make use of the cooling principle of operation referred to, I have designed certain forms of apparatus. The invention is not limited to the details, and to the specific arrangement of parts disclosed in this application, but any equivalent construction embodying the principle disclosed must be considered to be within the scope hereof.

The invention comprises a tank or casing through which a cooling fluid may be circulated. Disposed within the casing is a conduit of special construction, positioned in heat exchange relation to the cooling fluid in the tank. The conduit may be either of the straight line type, or may traverse a circuitous path, but it is an essential of the invention that the conduit be of a generally tapering form, to compensate somewhat for the contraction of the gases as they are cooled during their travel therethrough, and to blend the individual exhaust pulsations.

Furthermore, the walls of the conduit are preferably of gradually tapering thickness, from the rear toward the front, so that sound waves or vibrations set up in those walls will tend to travel toward the forward end of the device and be dissipated, interrupted, and interfered with by incoming sound waves.

An important result of the construction of the present invention is that it effects a substantially perfect blending, one with the other, of the many impulses of exhaust gases passing through the muffler and these gases are discharged in a substantially constantly flowing stream. This result is accomplished first, because of the gradual taper of the conduit, and secondly, because of the cooling of the hot gases, and the consequent contraction thereof, as fully explained below.

Any appropriate means for circulating the cooling fluid through the casing of the muffler of the present invention may be employed, and although I have shown a specific means, which in many cases will be satisfactory, the invention is not limited thereto.

In the accompanying drawings, three modifications of the present invention are disclosed.

Figure 1 is a longitudinal vertical sectional view through the muffler;

Figure 2 is a transverse vertical sectional view, taken on lines 2—2 of Figure 1;

Figure 3 is a vertical longitudinal sectional view of a modified form; and

Figure 4 is a sectional view of still another form of exhaust conduit which may be associated with the device of Figure 3, or slightly changed in shape and used with the construction of Figures 1 and 2.

In the drawings, 10 represents the discharge end of an exhaust manifold, collector ring, or conventional exhaust pipe. The casing 11 of the device of the present invention is welded at 12 to a packed joint 13, comprising an outer sleeve, an annular recess filled with asbestos or the like packing 14, and a clamping sleeve 15. The coupling 13 functions to provide a non-rigid but fluid-tight joint between the conduit 10 and the casing 11. In other words, the packing 14 provides a joint that will prevent the escape of the gaseous fluid in the exhaust manifold, but the connection between the manifold 10 and the muffler is non-rigid, in the sense that there is no metal to metal contact between the manifold 10 and the casing 11. Preferably the outer sleeve of the coupling is made of metal which does not readily transmit sound waves. Many appropriate metals of this kind are known, and are characterized by the fact that they do not "ring" when struck. In other words, they are relatively dead to the transmission of sound waves. Examples of such non-resonant metals are lead, lead alloys, zinc, zinc alloys, soft iron, and certain copper alloys.

The casing 11 may be made of two or more parts, and these may conveniently be joined by bolted flanges and a fluid-tight gasket, as indicated at 15'. Of course, the sections may be secured together at any other appropriate places, or, if desired, the sections may be permanently welded into a unitary structure.

Secured to the inner end of the sleeve 13, by a weld or the like, is a tube section 16, having its forward end 17 of an internal diameter somewhat larger than the adjacent end of the conduit 10. The tube tapers in cross sectional area from the end 17, which is of maximum size, to the end 18 which is somewhat reduced. The walls of the tube taper in thickness from a maximum at the end 18 to a minimum at the forward end 17.

Welded to the rear end of the tube 16 is a second tube section 19 which is likewise tapered in cross sectional area from a maximum at the end 20 to a minimum at the rear end 21. The walls of this section also taper toward the forward end thereof and are substantially thinner at the end 20 than at the opposite end 21.

A third tube section 22 is constructed substantially in accordance with the other two sections, and continues the gradual decrease in the cross sectional area of the conduit as a whole to a minimum at the end 23. Although the conduit tapers substantially constantly from one end of the casing to the other, it is at no point of less diameter than the end of manifold 10.

The adjacent ends of the tube sections are each welded to a ring or collar 24, which surrounds the line of juncture, insures the presence of a leak-proof joint, and assists in deadening sound waves or vibrations in the tube walls. Preferably, these rings are made of the same sound deadening metal as the sleeve 13.

Adjacent the rear end of the last section 22 of the exhaust conduit, I may connect a condenser, or supplemental muffler, represented generally at 25. This comprises an outer tube or casing 26 which is of generally frusto-conical shape, closed at its upper end by a plate 27 and at its lower end by a similar, but larger, plate 28. Within the outer tube 26 there is disposed an inner tube 29, of substantially cylindrical form, secured at its opposite ends to, and closed by, plates 27 and 28. The inner tube 29 is provided at its lower end with a plurality of pairs of diametrically opposed orifices 30, of different sizes.

The tube section 22 at its end 23 extends through an opening in the wall of the casing 26 and is welded thereto in a fluid-tight joint. The end 23 also extends into an orifice adjacent the upper end of the inner tube 29, is welded thereto, and is in communication with the interior thereof.

A plurality of discharge conduits 31, 32 extend into appropriate openings adjacent the upper end of the casing 26 of the condenser 25 and are in communication with the space between the inner and outer tubes. These discharge conduits extend through the rear wall of the housing 11, and are welded thereto by means of rings 33 and 34, of appropriate sound deadening metal.

Although any appropriate means may be employed for circulating a cooling fluid into and through the casing 11, I have shown a specific form which in many cases will be found to be satisfactory. This arrangement of parts is advantageous because of its simplicity and compactness, and because of its freedom from long connecting conduits and joints. It comprises a radiator 35, through which the cooling fluid may be circulated, a centrifugal pump 36, adapted to effect the circulation, and appropriate conduits. The pump may conveniently be driven by an air motor, in the form of a propeller 37, receiving its motivating force from the blast of the main propeller on the aeroplane. Of course, the pump might be driven by other suitable means, such as an electric motor, or an appropriate connection to a driving part on the engine of the aircraft.

When the pump is driven, heated fluid is drawn from the upper portion of the casing 10 through conduit 38 to the center of the centrifugal rotor. From that point, it is discharged radially through the volute casing of the pump and out through the discharge conduit 39, which may be shrouded by the radiator casing and appropriately streamlined. The fluid then flows through the radiator 35 and back to a lower portion of the casing 11 through the conduit 40. All exposed parts should be stream-lined.

All of the joints between the casing and the tubes should be welded, or otherwise secured against leakage.

Referring to the modified form of apparatus disclosed in Figure 3, it will be noted that substantially the same type of packed joint 13 is used. The principal difference between this form and the form disclosed in Figures 1 and 2 resides in the fact that the exhaust silencing tube is disposed in a substantially straight line. The tube sections 41 taper in cross sectional area from a maximum at the front end to a minimum at the rear end. Also, the walls of each section taper in thickness in an opposite direction, or from the rear toward the front. Since the supplemental muffler, expansion tank, or condenser of Figure 1 has been eliminated in the form disclosed in Figure 3, it is usually desired to accomplish the sound deadening function of that member by increasing the number of tapering tube sections. Because of the fact that the straight line construction enables me to reduce the cross-sectional size of the outer casing 11', with a consequent reduction in the volume of cooling fluid accommodated, I preferably provide the casing with cooling fins 42. Connecting rings 24', substantially similar to the corresponding elements disclosed in the first form of the invention, are employed in the device of Figure 3.

Referring to Figure 4, the tubes 43 each have a greater degree of taper, and the enlarged, thin walled end 44 of each tube is spaced outwardly from the adjacent end of the next tube by a spacer ring 45. This ring is also made of sound deadening metal. A casing similar to that disclosed in Figure 3, or some equivalent means for circulating a cooling fluid should be used with the tube construction of Figure 4.

In the operation of the device of the present invention, hot gases under high pressure are discharged through the pipe 10 in intermittent or pulsating flow. When each body, or pulsation of exhaust gas strikes the thin walled end of the cool tube 16, the outer portions of the same are instantly cooled and contracted. Because of frictional drag between the hot gases and the tube wall, the outer, contracted portions of the body of gas lag behind, while the central portion rushes ahead and comes into contact with the rearwardly disposed portion of the tube 16, and progressively with the thin walled portion of the next adjacent tube 19. At these latter points, the body of gas is further cooled and contracted, and because of the frictional drag through the gradually tapering tube, all portions of the gas eventually come into contact with the cooled walls, and give up heat thereto. Because of the varying thickness of the walls of the tube sections, the cooling and consequent contraction of the gases will be varying, with the result that certain areas of relative depression are created in the conduit. These areas assist in the mixing or blending, and consequent pressure equalization of the various exhaust impulses traversing the tube. The condenser or supplemental muffler 25 also materially assists in the reduction and equalization of pressure impulses in the system. The substantially cooled gases travel downwardly in the inner tube 29 without further cooling, and then flow outwardly and upwardly in the space between the tubes 29, 26, to be cooled therein. This space gradually decreases upwardly, to assure the intimate contact of the gases with the walls thereof. By the time the gases have reached the discharge conduits 31, 32, they have been cooled to substantially the temperature of the cooling fluid in the casing 11, and the individual pressure impulses have been eliminated, first by the contraction of the gas and second by the blending of the various impulses with one another. Thus, when the exhaust issues through the discharge tubes 31, 32, it is in the form of a substantially constantly flowing cool stream, and it creates little if any noise when it merges with the atmosphere.

The tapering thickness of the walls of each of the conduit sections performs an additional function than the one discussed above. Any sound waves or vibrations which are set up in the walls tend to travel from the thick end to the thin end, in the well known manner of a tuning fork. Thus such vibrations or sound waves will be absorbed by the small bodies of relatively "dead", non-resonant metal adjacent each thin end.

It is important to have the muffler attached to the exhaust manifold by a fluid-tight but non-rigid joint, to prevent vibrations set up in the manifold from being transmitted to the muffler casing. An illustrative embodiment of such a joint is represented at 13 in the drawings.

The device of Figure 3 operates in substantially the manner described above.

The construction of tube sections disclosed in Figure 4 results in an additional advantage, in that each tube discharges at its relatively constricted end into a considerably enlarged end of the next tube. The space within the enlarged end acts as an expansion chamber, and assists in the cooling and contracting of the gas, with a consequent increase in sound deadening efficiency, without any increase in back pressure.

The size and proportion of the parts of this apparatus will necessarily have to be varied considerably for different sizes of motors. Consequently, the specific disclosure of the present application must be considered as illustrative only, and not as limiting the invention, because many changes will readily occur to one skilled in the art, when applying the principles of the present invention to a particular aircraft.

I claim:

1. A muffler for the exhaust gases of an internal combustion engine, comprising an imperforate tube disposed in communication with said exhaust gases and adapted to conduct the same from said engine, a casing surrounding said tube and connected thereto solely by means of bodies of sound absorbing material interposed between said casing and tube, said casing providing a closed space exteriorly of the walls of said tube adapted for the circulation of a cooling fluid in heat exchange relation to said tube and the exhaust gases passing therethrough, to cool and contract the same and thereby substantially eliminate back pressure.

2. A muffler for the exhaust gases of an internal combustion engine, comprising a tube disposed in communication with said exhaust gases and adapted to conduct the same from said engine, a casing surrounding said tube and connected thereto by means of bodies of non-resonant metal interposed between said casing and tube, said casing providing a closed space exteriorly of the walls of said tube adapted for the circulation of a cooling fluid in heat exchange relation to said tube and the exhaust gases passing therethrough, to cool and contract said gases and thereby substantially eliminate back pressure.

3. A muffler for the exhaust gases of an internal combustion engine, comprising an imperforate tube disposed in communication with said gases and adapted to conduct the same from said engine, said tube being of tapering and substantially constantly decreasing internal diameter from its end adjacent said engine rearwardly, a casing surrounding said tube and providing a closed space exteriorly thereof adapted for the circulation of a cooling fluid in heat exchange relation to said tube to cool and contract said exhaust gases passing therethrough and thereby substantially eliminate back pressure, said casing and tube being substantially spaced apart except at points adjacent the connection therebetween, said connection being effected entirely by means of interposed bodies of sound absorbing material to prevent transmission of sound waves from said tube to said casing.

4. A muffler for the exhaust gases of an internal combustion engine, comprising a tube disposed in communication with said exhaust gases and adapted to conduct the same from said engine, said tube having its walls formed with a tapering and decreasing thickness from a point remote from said engine, forwardly, a casing surrounding said tube and providing a closed space exteriorly thereof adapted for the circulation of a cooling fluid in heat exchange relation to said tube to cool and contract said exhaust gases passing therethrough and thereby substantially eliminate back pressure, said casing being connected to said tube by bodies of non-resonant metal interposed therebetween.

5. A muffler for the exhaust gases of an internal combustion engine, comprising a tube disposed with its forward end in communication with said exhaust gases and adapted to conduct the same rearwardly from said engine, said tube having a tapering and decreasing internal diameter in rearward direction, and having its walls tapering and decreasing in thickness in an opposite, forward direction, and a connection between said tube and the exhaust manifold of the engine comprising a body of non-resonant metal.

6. A muffler for the exhaust gases of an internal combustion engine, comprising a tube disposed in communication with said exhaust gases and adapted to conduct the same rearwardly from said engine, said tube comprising a plurality of sections connected at adjacent ends to provide a continuous conduit, each of said sections having an internal diameter which tapers and decreases in the direction of flow of said gases, the connections between the individual sections comprising bodies of non-resonant metal.

7. A muffler for the exhaust gases of an internal combustion engine, comprising a tube disposed in communication with said exhaust gases and adapted to conduct the same rearwardly from said engine, a casing surrounding said tube and providing a closed space exteriorly of said tube adapted for the circulation of a cooling fluid in heat exchange relation to said tube to cool and contract exhaust gases passing therethrough, said tube comprising a plurality of sections connected at adjacent ends to provide a continuous conduit, each of said sections having a wall which tapers and decreases in thickness from end to end in a direction opposite to the flow of exhaust gases therethrough, whereby different areas in said tube have varying cooling and contracting effects on the pulsation of exhaust gas passing therethrough, to reduce said pulsations and accomplish a substantially continuous flow.

8. A muffler for the exhaust gases of an internal combustion engine, comprising a tube disposed in communication with said exhaust gases and adapted to conduct the same rearwardly from said engine, a casing surrounding said tube and providing a closed space exteriorly of said tube adapted for the circulation of a cooling fluid in heat exhange relation to said tube to cool and contract exhaust gases passing therethrough, said tube comprising a plurality of sections connected at adjacent ends to provide a continuous conduit, each of said sections having an internal diameter which tapers and decreases from end to end in the direction of flow of said gases, and each of said sections having a wall which tapers and decreases in thickness in an opposite direction, whereby different portions of said tube have different cross sectional areas and have varying cooling and contracting effects on the pulsations of exhaust gas passing therethrough, to reduce said pulsations and accomplish a substantially continuous flow.

9. A muffler for the exhaust gases of an internal combustion engine, comprising a serpentine tube disposed in communication with said exhaust gases and adapted to conduct the same rearwardly from said engine, a casing surrounding said tube and providing a closed space exteriorly of said tube adapted for the circulation of a cooling fluid in heat exchange relation to said tube to cool and contract exhaust gases passing therethrough, said tube comprising a plurality of curved sections connected at adjacent ends to provide a continuous conduit, each of said sections having a wall which tapers and decreases in thickness from end to end in a direction opposite to the flow of exhaust gases therethrough, whereby different areas in said tube have varying cooling and contracting effects on the pulsations of exhaust gas passing therethrough, to reduce said pulsations and accomplish a substantially continuous flow.

10. A muffler for the exhaust gases of an internal combustion engine, comprising a serpentine tube disposed in communication with said exhaust gases and adapted to conduct the same rearwardly from said engine, a casing surrounding said tube and providing a closed space exteriorly of said tube adapted for the circulation of a cooling fluid in heat exchange relation to said tube to cool and contract exhaust gases passing therethrough, said tube comprising a plurality of curved sections connected at adjacent ends to provide a continuous conduit, each of said sections having an internal diameter which tapers and decreases from end to end in the direction of flow of said gases, and each of said sections having a wall which tapers and decreases in thickness in an opposite direction, whereby different portions of said tube have different cross sectional areas and have varying cooling and contracting effects on the pulsations of exhaust gas passsing therethrough, to reduce said pulsations and accomplish a substantially continuous flow.

11. A muffler for the exhaust gases of an internal combustion engine, comprising a tube disposed with its forward end in communication with said gases and adapted to conduct the same rearwardly from said engine, a casing surrounding said tube and connected thereto by means of bodies of non-resonant metal, said casing providing a closed space exteriorly of the walls of said tube adapted for the circulation of a cooling fluid in heat exchange relation to said tube to cool and contract said exhaust gases passing therethrough, said tube comprising a plurality of sections each connected to another at adjacent ends by means of a body of non-resonant metal whereby sound wave vibrations set up in each of said tube sections are damped and cannot travel through the material of said sections to said casing.

12. A muffler for the exhaust gases of an internal combustion engine, comprising a tube disposed with its forward end in communication with said gases and adapted to conduct the same rearwardly from said engine, and connected to the exhaust discharge means of said engine by a body of non-resonant metal, a casing surrounding said tube and adapted for the circulation of a cooling fluid externally of said tube to cool and contract said exhaust gases passing therethrough, said tube comprising a plurality of sections, each having its walls of tapering and decreasing thickness in a forward direction, and each section being connected at its thin-walled, forward end to a body of non-resonant metal, whereby sound wave vibrations set up in said sections substantially all travel toward said forward, thin-walled end to be absorbed by said body of non-resonant metal.

13. A muffler for the exhaust gases of an internal combustion engine, comprising a tube having its forward end connected to the exhaust conduit of the engine, an exhaust condenser communicating with the rear end of said tube, an exhaust discharge means for said condenser, a housing surrounding said tube and said condenser and providing a closed space exteriorly of the walls thereof adapted for the circulation of a cooling fluid in heat exchange relation to said condenser, said condenser comprising an outer casing, a substantially concentric apertured inner casing, and closure plates for the ends thereof, the rear end of said tube being disposed to conduct exhaust gases into said inner casing, an aperture in the wall of said inner casing permitting the flow of said gases to the space between said concentric casings and into heat exchange relation to the outer casing to be cooled thereby, said exhaust discharge means in communication with said outer casing serving to conduct said cooled gases to atmosphere.

14. A muffler for the exhaust gases of an internal combustion engine, comprising a tube having its forward end connected to the exhaust conduit of the engine, an exhaust condenser communicating with the rear end of said tube, exhaust discharge means for said condenser, a housing surrounding said tube and said condenser and providing a closed space exteriorly of the walls thereof adapted for the circulation of cooling fluid in heat exchange relation to said condenser, said condenser comprising an outer frusto-conical casing in communication at its smaller end with said exhaust discharge means, and a coaxially disposed, substantially cylindrical inner casing in communication with the rear end of said tube adjacent said smaller end of said outer casing, said inner casing having an aperture in its wall adjacent its other end, and said casings forming an annular chamber therebetween of decreasing cross sectional area, whereby exhaust gases introduced into said inner casing pass through the aperture in the wall thereof and into the large end of said annular chamber in heat exchange contact with said outer casing to be cooled and contracted thereby, the cooled gases being discharged from the small end of said chamber to atmosphere through said exhaust discharge means.

15. A muffler for the exhaust gases of an internal combustion engine, comprising a tube having its forward end connected to the exhaust conduit of the engine, an exhaust condenser communicating with the rear end of said tube, exhaust discharge means for said condenser, a housing surrounding said tube and said condenser and providing a closed space exteriorly of the walls thereof adapted for the circulation of a cooling fluid in heat exchange relation to said condenser, said condenser comprising an outer frusto-conical casing in communication at its smaller end with said exhaust discharge means, a co-axially disposed, substantially cylindrical inner casing in communication with said rear end of said tube adjacent said smaller end of said outer casing, and closure plates for the ends of said casings, said inner casing having an aperture in its wall adjacent the larger end of said outer casing, and said casings and said closure plates forming an annular chamber of decreasing cross sectional area, whereby exhaust gases introduced into said inner casing pass through the aperture in the wall thereof and flow into the large end of said annular chamber in heat exchange contact with said outer casing to be cooled and contracted thereby, said cooled gases being discharged from the small end of said chamber to atmosphere through said exhaust discharge means.

16. A muffler for the exhaust gases of an internal combustion engine comprising an elongated tube disposed with its forward end in communication with said gases and adapted to conduct the same rearwardly from said engine, said tube comprising a plurality of sections, each having an enlarged forward end and a rear end of reduced diameter, the forward end of each rearwardly disposed section being disposed around the rear end of the adjacent section and being connected thereto by interposed annular bodies of non-resonant metal.

FRANK P. DAVIS.